US011204937B2

(12) United States Patent
Liu et al.

(10) Patent No.: US 11,204,937 B2
(45) Date of Patent: Dec. 21, 2021

(54) XBRL-BASED GLOBAL DATA STANDARDIZATION PLATFORM SYSTEM AND CONSTRUCTION METHOD THEREOF

(71) Applicant: SICHUAN CHANGHONG ELECTRIC CO., LTD., Mianyang (CN)

(72) Inventors: Dong Liu, Mianyang (CN); Jun Tang, Mianyang (CN); Yanlong Xu, Mianyang (CN); Bang Ju, Mianyang (CN)

(73) Assignee: SICHUAN CHANGHONG ELECTRIC CO., LTD., Sichuan Province (CN)

( * ) Notice: Subject to any disclaimer, the term of this patent is extended or adjusted under 35 U.S.C. 154(b) by 419 days.

(21) Appl. No.: 16/320,692

(22) PCT Filed: Jul. 20, 2017

(86) PCT No.: PCT/CN2017/093733
§ 371 (c)(1),
(2) Date: Jan. 25, 2019

(87) PCT Pub. No.: WO2018/019175
PCT Pub. Date: Feb. 1, 2018

(65) Prior Publication Data
US 2019/0163686 A1 May 30, 2019

(30) Foreign Application Priority Data
Jul. 26, 2016 (CN) .......................... 201610591155.6

(51) Int. Cl.
*G06F 16/25* (2019.01)
*G06F 16/00* (2019.01)
(Continued)

(52) U.S. Cl.
CPC ............ *G06F 16/258* (2019.01); *G06F 16/00* (2019.01); *G06F 16/986* (2019.01); *G06Q 40/02* (2013.01)

(58) Field of Classification Search
None
See application file for complete search history.

(56) References Cited

U.S. PATENT DOCUMENTS 7,822,769 B2 * 10/2010 Rohan .................... G06Q 90/00
707/777
2006/0041492 A1 * 2/2006 Takahashi .............. G06Q 40/00
705/35

(Continued)

FOREIGN PATENT DOCUMENTS

| CN | 103984702 A | 8/2014 |
|---|---|---|
| CN | 105224631 A | 1/2016 |
| CN | 106202536 A | 12/2016 |

OTHER PUBLICATIONS

International Search Report for PCT/CN2017/093733, dated Sep. 28, 2017.

(Continued)

*Primary Examiner* — Thu N Nguyen
(74) *Attorney, Agent, or Firm* — Caesar Rivise, PC

(57) ABSTRACT

The invention relates to a data standardization technology, and discloses an XBRL-based global data standardization platform system and a construction method thereof, so as to efficiently and conveniently integrate various types of data, and implement the data localization and globalization. The system comprises an XBRL DataCloud (XDC), an XBRL financial reporting intelligence platform (FRinp), an XBRL GL interchange platform (GLinp) and an XBRL standard data exchange channel deployed for operation on a server, wherein the XBRL DataCloud (XDC) designs the BIM data architecture of business data based on an abstract data model (Continued)

(ADM), the XBRL financial reporting intelligence platform (FRinp) establishes an extended group taxonomy system (GTS) based on the XDC business report data; the XBRL GL interchange platform (GLinp) establishes a mapping model from XDC to GL taxonomy by the other data except business report data in XDC according to data classification, solidifies the data mapping channel, parses the GL taxonomy through the XBRL intelligence engine (XIE), and automatically maps the relationship between the XDC business data elements and the XBRL GL taxonomy elements; and the XBRL standard data exchange channel is an export of standardized data.

10 Claims, 1 Drawing Sheet

(51) Int. Cl.
*G06F 16/958* (2019.01)
*G06Q 40/02* (2012.01)

(56) References Cited

U.S. PATENT DOCUMENTS

| | | | |
|---|---|---|---|
| 2007/0078877 A1* | 4/2007 | Ungar | G06F 40/154 |
| 2007/0162362 A1 | 7/2007 | Yamagishi et al. | |
| 2008/0059482 A1* | 3/2008 | Rohan | G06Q 90/00 |
| 2009/0006472 A1* | 1/2009 | Bush | G06Q 40/00 |
| 2014/0040182 A1* | 2/2014 | Gilder | G06Q 40/12 |
| | | | 707/602 |
| 2016/0012549 A1* | 1/2016 | Block | G06Q 40/12 |
| | | | 705/30 |

OTHER PUBLICATIONS

Satoh, F., et al., "Cloud-Based Infrastructure for Managing and Analyzing Environmental Resources," 2011 Annual SRII Global Conference, Apr. 2, 2011, uploaded from Internet on Jan. 31, 2019.

* cited by examiner

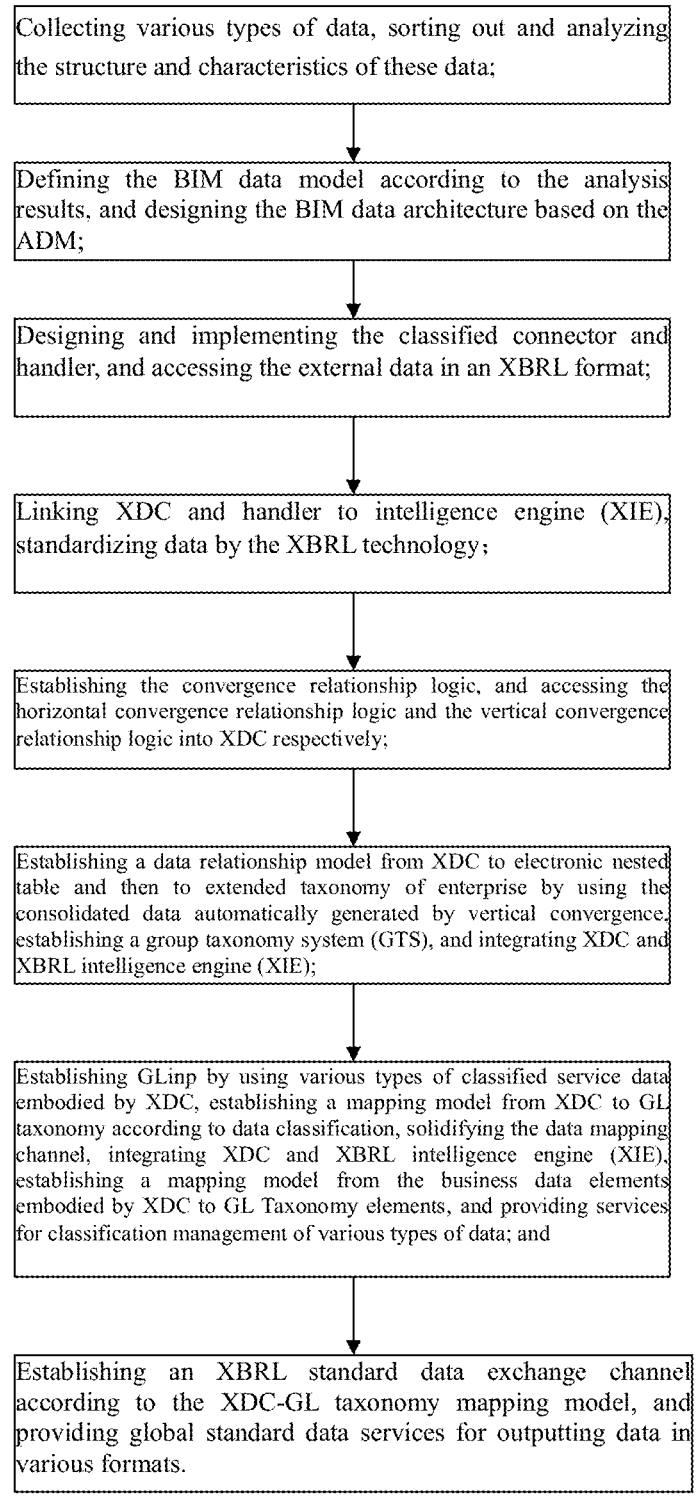

XBRL-BASED GLOBAL DATA STANDARDIZATION PLATFORM SYSTEM AND CONSTRUCTION METHOD THEREOF

CROSS-REFERENCE TO RELATED APPLICATIONS

This application is a U.S. National Phase Application of PCT/CN2017/093733, filed on Jul. 20, 2017, which claims priority to CN 201610591155.6, filed Jul. 26, 2016, the contents of which applications are incorporated herein by reference in their entireties for all purposes.

FIELD OF THE INVENTION

The invention relates to a data standardization technology, in particular to an XBRL-based global data standardization platform system and a construction method thereof.

BACKGROUND OF THE INVENTION

XBRL is an XML (Extensible Markup Language)-based open business reporting technology standard and a computer language specially used for the preparation, disclosure and application of financial report based on internet and cross-platform operations. By adding specific tags to data in business reports such as financial and accounting reports and defining their interrelationships, computers can "read" these reports and process them in accordance with business logic. XBRL GL is an XBRL taxonomy for recording transaction-level financial and non-financial details.

Facing the explosive growth of enterprise production and internet data, one of the most urgent problems to be solved by an enterprise is how to integrate various types of data efficiently and conveniently, make full use of various internal and external data and find valuable potential information from numerous data. The key of IoT is how to implement distributed analysis on the Internet of Things, localize and globalize complex and huge data, and build different levels of sharing and industry data.

SUMMARY OF THE INVENTION

The technical problem to be solved by the invention is to put forward an XBRL-based global data standardization platform system and a construction method thereof, so as to efficiently and conveniently integrate various types of data, and implement data localization and globalization.

Due to various systems and data sources are exist in enterprise information environment, different systems use different software vendors' products, the data standards, with strong vendors' systems, lack of a common proprietary format, while XBRL is an open international standard which is not limited to a specific operating platform. The invention makes use of XBRL-GL technology to realize the communication between systems, and achieve the purpose of integrating the original systems. XBRL-GL does not rely on systems, so that structured and unstructured data from different sources can be combined together, thus solving the problem of data interface docking between different systems.

A technical scheme for solving the technical problem of the invention is an XBRL-based global data standardization platform system, comprising an XBRL DataCloud (XDC), an XBRL financial reporting intelligence platform (FRinp), an XBRL GL interchange platform (GLinp) and an XBRL standard data exchange channel deployed for operation on a server;

Marking the data of each business system with XBRL through XBRL GL interchange platform (GLinp), meanwhile, cleaning and converting the business data into XBRL compliant data and loading it into XBRL DataCloud (XDC). Then distributing the data from subscription datacloud XDC to different systems through the XBRL standard data exchange channel. For the financial reports which need to be disclosed in XBRL format, XBRL intelligent reporting platform can be used to complete the release and disclosure of information. Since the integrated system adopts a unified data standard and data transmission format, the model transformation in the process of data transmission is greatly reduced. At the same time, all data comes from the unique data source, which avoids the possibility of errors in the flow and improves the accuracy of data and business processing efficiency.

the XBRL DataCloud (XDC) designs the BIM data architecture of business data based on an abstract data model (ADM); in XDC, a horizontal convergence relationship is maintained between ADM, various levels of consolidated data and various types of business data, and a vertical convergence relationship is maintained between the business data, accounting data and consolidated data; the horizontal convergence relationship involves the data at various levels embodied by ADM, and the vertical convergence relationship involves the drill-up/down of data consolidation and tracing; and the convergence relationship is designed and implemented outside XDC to decouple from XDC itself; XBRL establishes effective links between different information through XLink and Xpoint technology, which enables to conduct effectively track according to the information clue defined in advance, and search layer by layer till to the bottom of the defined electronic data.

the XBRL financial reporting intelligence platform (FRinp) establishes an extended group taxonomy system (GTS) based on the XDC business report data; and the reporting entity creates and expands the taxonomy in GTS assembly mode, parses the extended enterprise taxonomy through an XBRL intelligence engine (XIE), establishes a data relationship model from XDC to electronic nested table and to extended enterprise taxonomy, automatically associates the consolidated data in XDC with the extended enterprise taxonomy elements, and realizes the chain output of business report instance documents in a standard XBRL format at various levels;

the XBRL GL interchange platform (GLinp) establishes a mapping model from XDC to GL taxonomy by the other data except the business report data in XDC according to data classification, solidifies the data mapping channel, parses the GL taxonomy through the XBRL intelligence engine (XIE), and automatically maps the relationship between the XDC business data elements and the XBRL GL taxonomy elements;

the XBRL standard data exchange channel is an export of standardized data, and outputs the data to be exchanged and shared by XDC as GL Instance, CSV files, JSON data, and Web Service in an XBRL format, exchanges the data in an XBRL format with ERP, integrates FIS and CRM business information systems, shares the internal and cross-domain standard data of an enterprise, and directly retrieves electronic accounting data by an audit software for output.

Furthermore, the business data comprise consolidated data and ERP data associated therewith, FIS data, various business information system data, DW data, CRM data, SRM data, internet data, user behavior data, external disclosure data and detail data at transaction level.

Furthermore, the XBRL DataCloud (XDC) is used to achieve the hybrid cloud storage of business data dictionary, XBRL industry taxonomy and standardized business data element Ontology by using RDB, NoSql, HDFS, GFS, distributed file system and other technologies.

Furthermore, XDC standardizes the semantics of various types of financial and non-financial, structured and unstructured data by the XBRL technology, and standardizes the data values by the formatting method; data sources comprise consolidated data and others except the consolidated data, and the consolidated data are extracted into the data cache by the ETL method, then are automatically mapped and standardized according to a predefined mapping model; for data except the consolidated data, including internal and external data of an enterprise and internet data, the connector and handler are designed according to the characteristics of the data structure, and various data mapping models are solidified to allow these data to be automatically mapped and standardized; XDC also receives external data in a standard XBRL format, and these data are parsed by the XBRL intelligence engine (XIE) to automatically generate data in a standard XBRL format.

Furthermore, the GLinp may manage and monitor XDC as follows: monitoring of connector and handler for automatic standardization of various types of data, classified management of various types of standardized data, statistics and analysis of data standardization rate and utilization rate, and management of data security.

Furthermore, the other data except the business report data in XDC include financial and non-financial detail data at transaction level, accounting data and business data, structured data and unstructured data.

In addition, another object of the invention is to provide a construction method of an-XBRL based global data standardization platform system, comprising the following steps:

a. collecting various types of data contained in the XDC cloud storage, sorting out and analyzing the structure and characteristics thereof;

b. defining the BIM data model according to the analysis results, designing the BIM data architecture based on the ADM, and storing the BIM data dictionary and taxonomy;

c. designing and implementing the classified connector and handler respectively according to various types of data and the XDC constructed in step b, and accessing external data in an XBRL format;

d. linking the XDC constructed in step b and the handler constructed in step c to the intelligence engine (XIE), standardizing data by the XBRL technology, and storing the standardized business data element Ontology;

e. establishing the convergence relationship logic, and accessing the horizontal convergence relationship logic and the vertical convergence relationship logic into XDC respectively;

f. establishing a data relationship model from XDC to electronic nested table and then to extended taxonomy of enterprise by using the consolidated data automatically generated by vertical convergence, realizing automatic mapping of data, establishing a group taxonomy system (GTS), integrating XDC and XBRL intelligence engine (XIE), and realizing the chain output of business reports with Frinp as the reporting entity;

g. establishing GLinp by using various classified business data embodied by XDC, establishing a mapping model from XDC to GL taxonomy according to data classification, solidifying the data mapping channel, integrating XDC and XBRL intelligence engine (XIE), establishing a mapping model from the business data elements embodied by XDC to GL Taxonomy elements, and providing services for classification management of various types of data; and h. establishing an XBRL standard data exchange channel according to the XDC-GL taxonomy mapping model, and providing global standard data services for outputting data in various formats.

Furthermore, in step a, various types of data contained in the XDC cloud storage specifically comprise:

consolidated data and ERP data associated therewith, FIS data, various business information system data, DW data, CRM data, SRM data, internet data, user behavior data, external disclosure data and detail data at transaction level.

Furthermore, in step e, the horizontal convergence relationship logic and the vertical convergence relationship logic are respectively accessed to XDC, so as to enable XDC to embody the business data, realize the drill-up/down of data and integrate various types of data in XDC.

Furthermore, in step h, the global standard data services for outputting data in various formats comprises GL Instance, CSV files, JSON data, and Web Service in an XBRL format.

The beneficial effects of the invention are as follows: the XBRL-based global data standardization platform system automatically standardizes data resources by the XBRL technology, so as to efficiently and conveniently integrate various types of data, including financial data and non-financial data, permeate the disclosure data, internal accounting data and business data into all levels of enterprises, establish XBRL data network, break down data barriers between business systems such as enterprise resource plans and data warehouses, and realize the company's transformation from single system data integration to unified enterprise data integration.

For XBRL technology as a global standard, all software companies and information systems adopting XBRL technology must comply with the relevant standards of XBRL, which enables both software and information systems can process XBRL data uniformly, eliminates the problem of incompatibility of systems, facilitates the automatic exchange and processing of information, and improves the efficiency of computer processing of business data. Since XBRL is a branch of XML about enterprise reporting, it inherits the feature of XML extensible markup. Therefore, while following the XML standard technical framework, XBRL still retains sufficient flexibility to allow different countries, different industries and even different enterprises to extend markup according to their practical situations, thus solving the extensibility problem to a certain extent.

BRIEF DESCRIPTION OF THE DRAWINGS

FIG. 1 is a flowchart of a construction method of an XBRL-based global data standardization platform system in an example.

DETAILED DESCRIPTION OF THE PREFERRED EMBODIMENT

The technical scheme of the invention will be further described in combination with examples and drawings.

Example 1

The XBRL-based global data standardization platform system comprises an XBRL DataCloud (XDC), an XBRL financial reporting intelligence platform (FRinp) and an XBRL GL interchange platform (GLinp). It is a large distributed platform system with service-oriented architecture.

Each component is described in detail as follows:

Based on the abstract data model (ADM), XDC designs the data architecture of business information model (BIM); and these data include consolidated data (Consolidated Statementand) ERP data associated therewith, FIS data, various business information system data, DW data, CRM data, SRM data, internet data, user behavior data, external disclosure data and detail data at transaction level (parties). Further, XDC realizes the hybrid cloud storage of business data dictionary, XBRL industry taxonomy and standardized business data element Ontology by using RDB, NoSql, HDFS, GFS, distributed file system and other technologies. In XDC, a horizontal convergence relationship is maintained between ADM, various levels of consolidated data and various types of business data, and a vertical convergence relationship is maintained between the business data, accounting data and consolidated data. The horizontal convergence relationship involves the data at various levels embodied by ADM, and the vertical convergence relationship involves the drill-up/down of data consolidation and tracing. The convergence relationship is designed and implemented outside XDC to decouple from XDC itself, for example, vertical drill-up data consolidation logic.

The XDC global data standardization is used to standardize the semantics of various types of financial and non-financial, structured and unstructured data by the XBRL technology, and standardizes the data values by the formatting method. Data sources include extracting consolidated data (Consolidated Statement) into a data cache area by the ETL method, automatically mapping and standardizing consolidated data according to a predefined mapping model. For data except the consolidated data, including internal and external data of an enterprise and internet data, the connector and handler are designed according to the characteristics of the data structure, and various data mapping models are solidified to allow these data to be automatically mapped and standardized. External data in a standard XBRL format are received and parsed by the XBRL Intelligence Engine (XIE) for automatically generating data in a standard XBRL format.

FRinp establishes an extended group taxonomy system (GTS) based on the XDC business report data, i.e. consolidated data. The reporting entity rapidly creates and expands the taxonomy in GTS assembly mode, parses the extended enterprise taxonomy through an XBRL intelligence engine (XIE), establishes a data relationship model from XDC to electronic nested table and extended enterprise taxonomy, automatically associates the consolidated data in XDC with the extended enterprise taxonomy elements, and realizes the chain output of business report instance documents in a standard XBRL format at various levels.

Based on the other data except the business report data in XDC, including financial and non-financial detail data at transaction level, accounting data and business data, structured data and unstructured data, GLinp establishes a mapping model from XDC to GL Taxonomy, solidifies the data mapping channel, and automatically maps the relationship between the XDC business data elements and the XBRL GL Taxonomy elements by parsing the GL Taxonomy via the XBRL Intelligence Engine (XIE). GLinp may manage and monitor XDC as follows: monitoring of the connector and the handler for automatic standardization of various types of data, classified management of various types of standardized data, statistics and analysis of data standardization rate and utilization rate, management of data security etc.

XBRL standard data exchange channel is an export of standardized data. The output part of GLinp standard data outputs the data to be exchanged and shared by XDC as GL Instance, CSV files, JSON data, and Web Service in the XBRL format, exchanges the data in the XBRL format with ERP, integrates FIS and CRM business information systems, shares the internal and cross-domain standard data of an enterprise, and directly retrieves electronic accounting data by an audit software for output. Thus, XBRL standard data exchange channel realizes the change from single system data integration to unified enterprise data integration.

In the invention, XDC is cross-domain XBRL global standard data cloud and has the capability of consolidating and organizing various types of data into a data network. Frinp consumes the consolidated data in XDC and generates business reports at all enterprise levels and reporting cycles in the form of a reporting chain. GLinp is responsible for the management, monitoring and analysis of XDC's data source, data access, mapping model, data standardization, unified exchange, data security and XDC itself. XIE is an XBRL processor that fully supports the technical specification, *Extensible Business Reporting Language (XBRL)* 2.1, i.e. XBRL Intelligence Engine, and has the capability of universal classification standards, including XBRL GL Taxonomy.

Example 2

As shown in FIG. 1, in this example, the construction method of the global data standardization platform system in example 1 includes the following implementation steps:

step 1: collecting various types of data contained in the XDC cloud storage, such as financial and non-financial data, structured data and unstructured data, sorting out and analyzing the structure and characteristics of these data;

step 2: defining the BIM data model according to the analysis results in step 1, designing and implementing the BIM data architecture based on the Abstract Data Model (ADM), and storing the BIM data dictionary and Taxonomy;

step 3: designing and implementing a classified connector and a handler respectively according to various types of data and the XDC constructed in step 2, and accessing external data in an XBRL format;

step 4: linking the XDC constructed in step 2 and the handler constructed in step 3 to the intelligence engine (XIE), standardizing data by the XBRL technology, and storing the standardized business data element Ontology;

step 5: establishing convergence relationship logic on the basis of XDC in step 4, and accessing the horizontal convergence relationship logic and the vertical convergence relationship logic into the XDC respectively, so as to enable XDC to embody the business data and realize the drill-up/down of data, and integrate various types of data in XDC;

step 6: establishing a data relationship model from XDC to electronic nested table and then to extended enterprise taxonomy by using the consolidated data automatically generated by XDC vertical convergence in step 5, realizing automatic mapping of data, establishing a group taxonomy system (GTS), integrating XDC and XBRL intelligent engine (XIE), and enabling automatic generation of instance document by FR efficient extended taxonomy and parsing taxonomy, and realizing the chain output of business reports with Frinp as the reporting entity;

step 7: establishing GLinp by using the various classified business data embodied by XDC in step 5, building a mapping model from XDC to GL Taxonomy according to the data classification, solidifying the data mapping channel, integrating XDC and XBRL Intelligence Engine (XIE), building a mapping model from specific XDC business data elements to the GL Taxonomy elements, providing services for classification management of various types of data, and managing the XBRL standard data exchange channels;

step 8: according to the mapping model from XDC to GL Taxonomy in step 7, establishing XBRL standard data exchange channels, and providing global standard data outputting services such as GL Instance, CSV files, JSON data and Web Service in an XBRL format and other data formats.

The invention claimed is:

1. An eXtensible Business Reporting Language-based global data standardization platform system, comprising:
a server having a processor and a memory, the memory storing instructions to cause the processor to deploy an eXtensible Business Reporting Language DataCloud (XDC), an eXtensible Business Reporting Language financial reporting intelligence platform (FRinp), an eXtensible Business Reporting Language Global Ledger interchange platform (GLinp) and an eXtensible Business Reporting Language standard data exchange channel for operation on the server; wherein
the eXtensible Business Reporting Language DataCloud (XDC) designs the Business Information Model data architecture of business data based on an abstract data model (ADM); in XDC, a horizontal convergence relationship is maintained between ADM, various levels of consolidated data and various types of business data, and a vertical convergence relationship is maintained between business data, accounting data and consolidated data; the horizontal convergence relationship involves the data at various levels embodied by ADM, and the vertical convergence relationship involves the drill-up/down of data consolidation and tracing; and the convergence relationship is designed and implemented outside XDC to decouple from XDC itself,
the eXtensible Business Reporting Language financial reporting intelligence platform (FRinp) establishes an extended group taxonomy system (GTS) based on the XDC business report data; and the reporting entity creates and expands the taxonomy in GTS assembly mode, parses the extended enterprise taxonomy through an eXtensible Business Reporting Language intelligence engine (XIE), establishes a data relationship model from XDC to electronic nested table and then to extended enterprise taxonomy, automatically associates the consolidated data in XDC with the extended enterprise taxonomy elements, and realizes the chain output of business report instance documents in a standard eXtensibie Business Reporting Language format at various levels;
the eXtensible Business Reporting Global Ledger interchange platform (GLinp) establishes a mapping model from XDC to Global Ledger taxonomy by the other data except the business report data in XDC according to data classification, solidifies the data mapping channel, parses the Global Ledger taxonomy through the eXtensible Business Reporting Language intelligence engine (XIE), and automatically maps the relationship between the XDC business data elements and the eXtensible Business Reporting Language Global Ledger taxonomy elements;
the eXtensible Business Reporting Language standard data exchange channel is an export of standardized data, and outputs the data to be exchanged and shared by XDC as Global Ledger Istance, Comma- Separated Values files, JavaScript Object Notation data, and Web Service in an eXtensible Business Reporting Language, format, exchanges the data in an eXtensible Business Reporting Langiage format with Enterprise Resource Planning, integrates Financial Information System and Customer Relationship Management business information systems, shares the internal and cross-domain standard data of an enterprise, and directly retrieves electronic accounting data by an audit software for output.

2. The eXtensible Business Reporting Language-based global data standardization platform system according to claim 1, wherein the business data includes consolidated data and Enterprise Resource Planning data associated therewith, Financial Information System data, various business information system data, DW data, Customer Relationship Management data, SRM data, internet data, user behavior data, external disclosure data and detail data at transaction level.

3. The eXtensible Business Reporting Language-based global data standardization platform system according to claim 1, wherein the eXtensibie Business Reporting Language DataCloud (XDC) is further used to achieve the hybrid cloud storage of business data dictionary, eXtensible Business Reporting Language industry taxonomy and standardized business data element Ontology by using Relational Database, Not Only Structure Query Language, Hadoop Distributed File System, Google File System, distributed file system and other technologies.

4. The eXtensible Business Reporting Language-based global data standardization platform system according to claim 1, wherein the XDC standardizes the semantics of various types of financial and non-financial, structured and unstructured data by the eXtensible Business Reporting Language technology, and standardizes the data values by the formatting method; data sources comprise consolidated data and others except the consolidated data, and the consolidated data are extracted into the data cache area by the Extraction-Transformation-Loading method, then are automatically mapped and standardized according to a pre-defined mapping model; for data except the consolidated data, including internal and external data of an enterprise and internet data, the connector and handler are designed according to the characteristics of the data structure, and various data mapping models are solidified to allow these data to be automatically mapped and standardized; XDC also receives external data in a standard XBRL format, and these data are parsed by the eXtensible Business Reporting Language intelligence engine (XIE) to automatically generate data in a standard eXtensible Business Reporting Language format.

5. The eXtensibie Business Reporting Language-based global data standardization platform system according to claim 1, wherein the GLinp manages and monitors XDC as follows: monitoring of connector and handler for automatic standardization of various types of data, classified management of various types of standardized data, statistics and analysis of data standardization rate and utilization rate, and management of data security.

6. The eXtensible Business Reporting Language-based global data standardization platform system according to claim 1, wherein the other data except the business report data in XDC include financial and non-financial detail data at transaction level, accounting data and business data, structured data and unstructured data.

7. A construction method of an eXtensible Business Reporting Language-based global data standardization platform system, comprising:
(a). collecting various types of data contained in the XDC cloud storage, sorting out and analyzing the structure and characteristics thereof;
(b). defining the Business Information Model data model according to the analysis results, designing the Business Information Model data architecture based on the ADM, and storing the Business Information Model data dictionary and taxonomy;
(c). designing and implementing the classified connector and handler respectively according to various types of data and the XDC constructed in step b, and accessing external data in an eXtensible Business Reporting Language format;
(d). linking the XDC constructed in step b and the handler constructed in step (c) to the intelligence engine (XIE), standardizing data by the eXtensible Business Reporting Language technology, and storing the standardized business data element Ontology;
(e). establishing the convergence relationship logic, and accessing the horizontal convergence relationship logic and the vertical convergence relationship logic into XDC respectively;
(f). establishing a data relationship model from XDC to electronic nested table and then to extended taxonomy of enterprise by using the consolidated data automatically generated by vertical convergence, realizing automatic mapping of data, establishing a group taxonomy system (GTS), integrating XDC and eXtensible Business Reporting Language intelligence engine (XIE), and realizing the chain output of business reports with Frinp as the reporting entity;
(g). establishing GLinp by using various classified business data embodied by XDC, establishing a mapping model from XDC to Global Ledger taxonomy according to data classification, solidifying the data mapping channel, integrating XDC and eXtensible Business Reporting Language intelligence engine (XIE), establishing a mapping model from the business data elements embodied by XDC to Global Ledger Taxonomy elements, and providing services for classification management of various types of data; and
(h). establishing an eXtensible Business Reporting Language standard data exchange channel according to the XDC-GL taxonomy mapping model, and providing global standard data services for outputting data in various formats.

8. The construction method of the eXtensible Business Reporting Language-based global data standardization platform system according to claim 7, wherein in step (a), various types of data contained in the XDC cloud storage specifically comprise:
consolidated data and Enterprise Resource Planning data associated therewith, Financial Information System data, various business information system data, DW data, Customer Relationship Management data, SRM data, internet data, user behavior data, external disclosure data and detail data at transaction level.

9. The construction method of the eXtensible Business Reporting Language-based global data standardization platform system according to claim 7, wherein in step (e), the horizontal convergence relationship logic and the vertical convergence relationship logic are respectively accessed to XDC, thus enabling XDC to embody the business data, realize the drill-up/down of data, and integrate various types of data therein.

10. The construction method of the eXtensible Business Reporting Language-based global data standardization platform system according to claim 7, wherein in step (h), the global standard data services for outputting data in various formats comprises Global Ledger Instance, Comma-Separated Values files, JavaScript Object Notation data, and Web Service in an eXtensible Business Reporting Language format.

* * * * *